United States Patent [19]

Eklund

[11] Patent Number: 4,461,491
[45] Date of Patent: Jul. 24, 1984

[54] TRAILER SAND SHOES

[75] Inventor: Louis E. Eklund, Muskegon, Mich.

[73] Assignee: Fleet Engineers, Inc., Muskegon Heights, Mich.

[21] Appl. No.: 397,128

[22] Filed: Jul. 12, 1982

[51] Int. Cl.³ ............................................. B60S 9/02
[52] U.S. Cl. ................................ 280/763.1; 212/189; 248/188.8; 248/352; 248/357; 254/DIG. 1
[58] Field of Search ............... 280/763.1, 764.1, 765.1, 280/766.1, 427–431, 475, 490 R, 490 A, 491 R, 491 A, 491 B, 491 C, 491 D, 491 E, 491 F; 248/357, 352, 188.8; 254/DIG. 1, 418; 212/189

[56] References Cited

U.S. PATENT DOCUMENTS

Re. 31,011  8/1982  Belke .............................. 280/763.1
3,544,053 12/1970  Ingalls ............................... 85/50 R
4,124,225 11/1978  Lozada ........................... 280/763.1

FOREIGN PATENT DOCUMENTS 438609  1/1975  U.S.S.R. ...................... 254/DIG. 1

Primary Examiner—David M. Mitchell
Assistant Examiner—Joseph G. McCarthy
Attorney, Agent, or Firm—Varnum, Riddering, Schmidt & Howlett

[57] ABSTRACT

A trailer sand shoe (10) mounted to the legs of a trailer vehicle includes a rectangular metal base plate (12) and upstanding sides (14) and (16) fixed to the base plate (12). The central portions of the side plates (14) and (16) have openings (32) in the top portion thereof for mounting the sand shoe (10) to the legs of the trailer vehicle. The base plate (12) includes an integral reinforcing portion (34) which extends perpendicularly between the side plates (14) and (16) and is formed from the base plate (12). The reinforcing portion (34) has a generally inverted V-shaped cross-sectional configuration. The central reinforcing portion (34) adds rigidity to the sand shoe (10) as well as reduces manufacturing costs by eliminating the need for a separate reinforcing member.

7 Claims, 3 Drawing Figures

TRAILER SAND SHOES

BACKGROUND OF THE INVENTION

1. Technical Field

The invention relates to trailer sand shoes which are secured to retractable supports for trailers.

2. Background Art

Trailer sand shoes are used on the bottom of retractable supports for trailers to prevent the supports from sinking into the ground. There are many types of sand shoes in commercial use at this time. The sand shoes generally comprise a rectangular base with upturned side edges and upstanding support plates secured to the base. The supports include a hole near their upper portion to mount the shoes to the trailer support legs.

Some of the prior-known sand shoes include a reinforcing member secured between the upstanding support plates. For example, the Claflin et al U.S. Pat. No. 3,751,067, issued Aug. 7, 1973, discloses a sand shoe wherein a rectangular cross-plate is welded between the upstanding side plates and to the upper surface of the base plate. The purpose of the cross-plate is to provide added rigidity and strength to the sand shoe. The Belke U.S. Pat. No. Re. 30,487, issued Jan. 20, 1981, also discloses a sand shoe having a rectangular cross-member welded between the side plates.

The Lozada et al U.S. Pat. No. 4,124,225 discloses another form of a sand shoe wherein an inverted V-shaped support member is welded to a flat base. The top of the V-shaped support member is curved so as to conform to the yoke of a landing gear leg of a trailer.

In the past, there have been manufactured and sold sand shoes of the type described above including a generally flat base plate with upturned edges and upstanding side support plates. The upstanding support plates could include a reinforced central portion in the form of an added plate. Also trailer sand shoes wherein a separate angle iron was welded between the upstanding side support plates have been manufactured and sold. The angle iron was welded between the side support plates in an inverted orientation. Other types of sand shoes manufactured and sold included at least one rectangular plate welded between the upstanding side support plates such as in the manner shown in the Claflin et al patent.

Those sand shoes which included some type of reinforcement welded in place between the upstanding side support plates have required the addition of a separate piece to provide the desired rigidity. The addition of a separate member requires added material and labor which increases the cost of the sand shoe.

DISCLOSURE OF INVENTION

A trailer sand shoe mounted to the legs of a trailer vehicle includes a rectangular metal base plate and metal support plates rigidly fixed to the base plate and extending upwardly therefrom. Each of the side support plates has a central web and side webs bent laterally with respect to the central web. The central portion of the side plates has an opening at the top thereof for mounting the sand shoe to the leg of a trailer vehicle.

The base plate includes an integral reinforcing portion which extends perpendicularly between and above the bottom of the central webs of the side plates and is formed from the base plate. The reinforcing portion is joined to the side plates along the intersecting edges thereof. The reinforcing portion adds rigidity to the sand shoe to prevent shearing or skewing of the upright side plates as well as reduces manufacturing costs by eliminating the need for a separate reinforcing member. The central webs of the side support plates are further joined to the base plate through welds which extend along the bottom edge of said central webs.

The reinforcing portion has a uniform inverted V-shaped cross-sectional configuration. The reinforcing portion is uniform in cross-sectional shape between the side support plates. The reinforcing portion is formed in the base plate by first forming two parallel slits in a flat, rectangular blank and thereafter deforming the portion between said slits upwardly with respect to the top surface of said blank and uniformly between said slits. Further strength is added to the base plate by forming embossments in the plate which extend perpendicular to the side support plates and which are spaced from the reinforcing portion.

BRIEF DESCRIPTION OF THE DRAWINGS

The invention will be described with reference to the accompanying drawings wherein like members bear like reference numerals and in which.

BEST MODE FOR CARRYING OUT THE INVENTION

Figure 1:
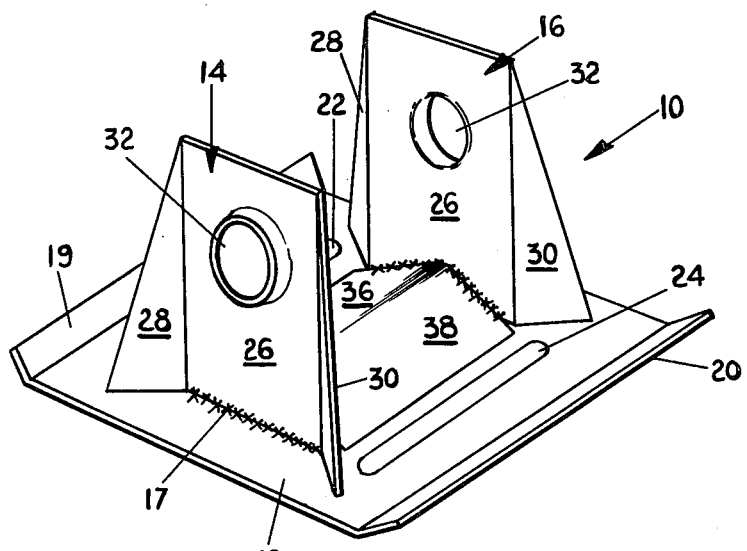
FIG. 1 is a perspective view of a trailer sand shoe in accordance with the invention.
Figure 2:
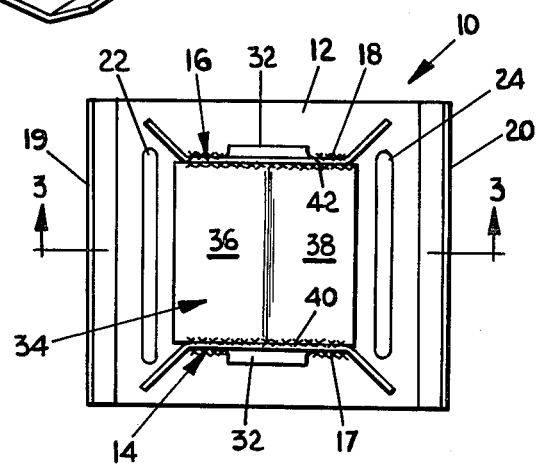
FIG. 2 is a plan view of the sand shoe of FIG. 1.
Figure 3:
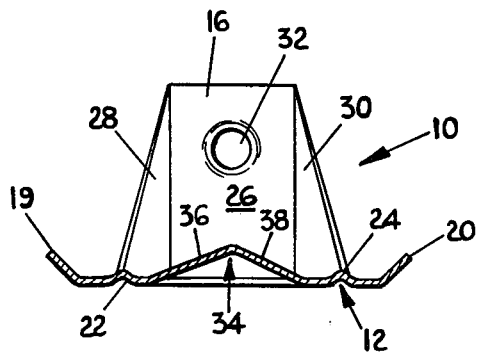
FIG. 3 is a cross-sectional view taken along line 3—3 of FIG. 2.

Referring to FIGS. 1 through 3, a sand shoe 10 has a rectangular base 12 and a pair of upstanding side supports 14 and 16. The side supports 14 and 16 are welded to the base 12 by fillet welds 17 and 18 which extend along the bottom edge of the side support plates 14 and 16. The base 12 has upturned ends 19 and 20 and two parallel embossments 22 and 24 which extend across the base between the side supports 14 and 16. The base is made from sheet steel and due to the rigidity provided by the embossments 22 and 24 can be made from a relatively thin stock such as 0.120 to 0.187 in. common low-carbon steel stock.

The upstanding side supports 14 and 16 are identical and only one will be described. Each side support includes a central web 26 and angled side portions 28 and 30. The side portions 28 and 30 are generally triangular in configuration and are disposed at an angle relative to the central web 26. The central web 26 of the side supports 14 and 16 each include a hole 32 formed in the central portion thereof for receiving an axle on a trailer leg. The side supports are formed from steel sheet, preferably 0.25 in. steel.

The base 12 includes an integrally formed, angled center portion 34 having two walls 36 and 38 which are at an angle of about 120° with respect to each other. Walls 36 and 38 are positioned at an angle of about 30° to the plane of the base 12. The angled portion 34 provides increased rigidity in a lateral sense so as to strengthen the sand shoe. The angled portion 34 is welded to the side supports 14 and 16 by fillet welds 40 and 42 and extend perpendicularly between and above the bottom of the central webs of the side support plates. The angled portion 34 and the side supports 14 and 16 are welded along the intersection of walls 36 and 38 with the central webs 26 of the side supports 14 and 16. It can be seen that the central reinforcing portion 34 has a uniform, inverted V-shaped cross-sectional configuration so that it is uniform in shape between the side support plates 14 and 16.

The sand shoes are secured to the retractable legs of a trailer which is normally pulled by a tractor through a fifth wheel. When the trailer is disengaged from the fifth wheel of a tractor, the legs are extended from a retracted position so that the bottom portions rest on the ground. The sand shoes are secured to the legs of the trailer support in a conventional fashion with an axle inserted and secured through the holes 32. The front end of the trailer rests on the support legs and on the sand shoes when the trailer is not secured to the fifth wheel of a tractor.

The base 12 of the sand shoe is stamped from ordinary sheet stock and the upturned ends 19 and 20 and embossments 22 and 24 are formed in a stamping operation. The angled portion 34 is formed by forming two parallel slits in the base plate and then deforming the central portion of the plate upwardly with respect to the surface of the plate and uniformly between the slits. The central portion is then welded to the side supports 14 and 16 as described above. The side supports 14 and 16 and the holes therein are formed in a stamping operation. The side walls 28 and 30 are bent in a forming operation to the desired angle.

It has been found that the above-described sand shoe functions in a satisfactory fashion when placed in service. In this regard, the sand shoe is able to support the load of a trailer without failure. The angled central portion of the base provides rigidity to the side plates by minimizing shearing or skewing thereof when subjected to a vertical load.

A substantial cost reduction is also accomplished by making the central portion integral with the base plate. In the past, the use of a separate reinforcing member welded between the side supports required additional manufacturing steps as well as a separate piece which are now eliminated. The above-described sand shoe thus allows for a cost reduction, surprisingly, without any sacrifice in function or strength.

Reasonable variation and modification are possible within the scope of the foregoing disclosure and drawings without departing from the spirit of the invention which is defined in the appended claims.

I claim:

1. In a trailer sand shoe for use on the bottom of support legs on a trailer vehicle, the sand shoe comprising:
   a rectangular metal base plate having a central portion;
   metal side support plates rigidly fixed to said base plate and extending upwardly therefrom, each of said side support plates having a central web and side webs bent laterally of said central web, the central web being generally perpendicular to the base plate and having an opening therein at the top thereof for mounting the sand shoe to support legs of a trailer vehicle;
   the improvement which comprises:
   said base plate including an integral reinforcing portion formed from said base plate and comprising an upward deformation of said central portion extending perpendicularly between and above the bottom of said central webs of said side support plates and joined thereto, said deformation having side edges formed by slits in the base, the side edges of the deformation abutting the central webs of the side support plates and extending to a height sufficient to rigidify the side support plates against lateral movement.

2. The trailer sand shoe of claim 1 wherein said integral reinforcing portion has a uniform inverted V-shaped cross-sectional configuration.

3. The trailer sand shoe of claim 2 wherein said base plate further includes strengthening embossments extending perpendicular to said side support plates and spaced apart from said reinforcing portion.

4. The trailer sand shoe of claim 2 wherein said integral reinforcing portion is joined to said central webs by welds therebetween.

5. The trailer sand shoe of claim 4 wherein said central webs are further joined to said base plate through welds which extend along a bottom edge of said central webs.

6. The trailer sand shoe of claims 1, 2, 4 or 5 wherein said integral reinforcing portion is formed by first making two parallel slits in a flat rectangular blank and thereafter deforming the portion between said slits upwardly with respect to a top surface of said blank and uniformly between said slits.

7. The trailer sand shoe of claim 6 wherein said integral reinforcing portion is uniform in cross-sectional shape between said side support plates.

* * * * *